(12) United States Patent
Liang

(10) Patent No.: US 7,028,126 B1
(45) Date of Patent: Apr. 11, 2006

(54) UNIVERSAL SERIAL BUS FOR MOBILE DEVICES HAVING EXPANSION MODULES

(76) Inventor: Ping Liang, 18 Vienne, Irvine, CA (US) 92606

( * ) Notice: Subject to any disclaimer, the term of this patent is extended or adjusted under 35 U.S.C. 154(b) by 242 days.

(21) Appl. No.: 09/667,091

(22) Filed: Sep. 21, 2000

(51) Int. Cl.
G06F 13/00 (2006.01)
G06F 1/26 (2006.01)

(52) U.S. Cl. .................. 710/301; 710/303; 713/300

(58) Field of Classification Search .............. 710/2, 710/62–63, 300–304, 104, 105; 713/300, 713/310, 340
See application file for complete search history.

(56) References Cited

U.S. PATENT DOCUMENTS

| | | | | |
|---|---|---|---|---|
| 5,784,581 A | * | 7/1998 | Hannah | 710/110 |
| 5,841,424 A | * | 11/1998 | Kikinis | 345/168 |
| 5,983,297 A | * | 11/1999 | Noble et al. | 710/312 |
| 6,041,372 A | * | 3/2000 | Hart et al. | 710/62 |
| 6,094,063 A | * | 7/2000 | St. Pierre et al. | 326/37 |
| 6,148,354 A | * | 11/2000 | Ban et al. | 710/301 |
| 6,203,344 B1 | * | 3/2001 | Ito | 439/218 |
| 6,280,252 B1 | * | 8/2001 | Huang | 439/610 |
| 6,351,809 B1 | * | 2/2002 | St. Pierre et al. | 713/1 |
| 6,473,790 B1 | * | 10/2002 | Tagi | 709/216 |
| 6,507,882 B1 | * | 1/2003 | Golka et al. | 710/302 |
| 6,523,079 B1 | * | 2/2003 | Kikinis et al. | 710/303 |
| 6,549,958 B1 | * | 4/2003 | Kuba | 710/14 |
| 6,633,932 B1 | * | 10/2003 | Bork et al. | 710/72 |
| 6,769,035 B1 | * | 7/2004 | Garreau | 710/14 |
| 2001/0021101 A1 | * | 9/2001 | Tong et al. | |

* cited by examiner

Primary Examiner—Rehana Perveen
Assistant Examiner—Trisha Vu

(57) ABSTRACT

A mobile device such as a personal digital assistant ("PDA") includes a Universal Serial Bus ("USB") connector in an expansion module bay. An expansion module for the mobile device includes a USB connector that mates with the connector in the expansion module bay. The expansion module may be plugged directly into the expansion bay of the mobile device, or it may be connected (via an adapter) to another device having a standard USB downstream connector.

27 Claims, 2 Drawing Sheets

UNIVERSAL SERIAL BUS FOR MOBILE DEVICES HAVING EXPANSION MODULES

BACKGROUND

The present invention relates generally to data communication. More particularly, the present invention relates to a Universal Serial Bus ("USB") interface for mobile devices.

Expansion modules can increase functionality of certain mobile devices. For instance, an expansion module can be plugged into a personal digital assistant ("PDA") to provide network connectivity or wireless communications. The expansion module might include a game card.

A typical expansion module is connected to a mobile device via a parallel bus. The bus is proprietary to each device, and it typically has between twenty-four and sixty-four pins. Because the bus is proprietary, the expansion module cannot be readily used with personal computers, PDAs made by different manufacturers, and other computer-based products.

SUMMARY

According to one aspect of the present invention, a mobile device includes a housing having an expansion module bay; and an expansion module having a first USB connector. A second USB connector is positioned inside the bay to mate with the first USB connector when the expansion module is inserted in the bay.

Other aspects and advantages of the present invention will become apparent from the following detailed description, taken in conjunction with the accompanying drawings, illustrating by way of example the principles of the present invention.

DETAILED DESCRPTION

The present invention will be described in connection with a mobile device commonly known as a personal digital assistant, pocket computer or palmtop PC. This device will be referred to as a PDA throughout the application. It is understood, however, that the present invention is not limited to PDAs and may be embodied in other types of mobile devices, such as cellular phones and digital cameras.

Figure 1:
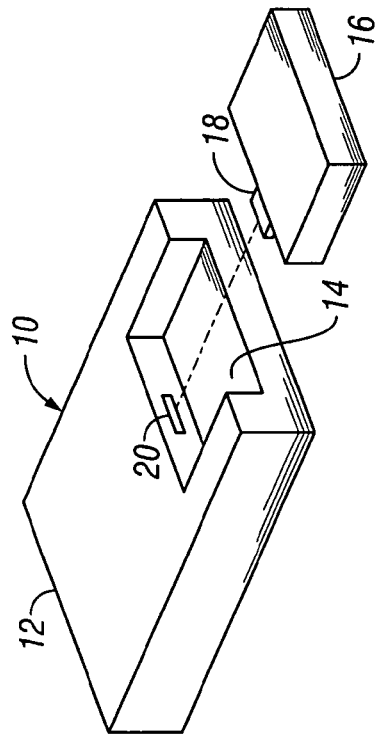
FIG. 1 is an illustration of a PDA including an expansion module.

Reference is made to FIG. 1, which shows a PDA 10. The PDA 10 includes a housing 12 and other standard components including, but not limited to, a processor, memory, a display, I/O ports and a battery. These other standard components are not shown in FIG. 1.

The housing 12 has an expansion module bay 14 for receiving an expansion module 16. The expansion module 16 can be plugged into the mobile device 10 to provide enhanced functionality to the mobile device 10 (e.g., network connectivity, wireless communication, a game card).

The expansion module 16 has a first USB connector 18 (also referred to as the module USB connector 18). A second USB connector 20 (also referred to as the PDA USB connector 20) is positioned inside the expansion module bay 14 to mate with the module USB connector 18 when the expansion module 16 is inserted in the bay 14. The module and PDA USB connectors 18 and 20 have a form factor that is different than a standard USB form factor. Considering the small size of most PDAs, the module and PDA USB connectors 18 and 20 will probably have a form factor that is smaller than a standard USB form factor.

Figure 2:
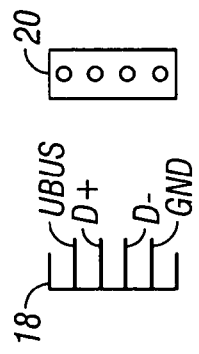
FIG. 2 is an illustration of first and second USB connectors for the PDA and the expansion module of FIG. 1.

Reference is now made to FIG. 2. Each USB connector 18 and 20 includes a power pin (Vbus), a ground pin (GND), a data-plus pin (D+) and a data-minus pin (D−). Each USB connector 18 and 20 may also include an identification (ID) pin. The identification pin indicates a USB host or a USB device. The identification pin (ID) is grounded for a host and it is floating for a device. In FIG. 2, the module USB connector 18 is shown as having a male configuration and the PDA USB connector 20 is shown as having a female configuration. However, the PDA 10 may have a male USB connector and the expansion module 16 may have a female USB connector.

Figure 3:
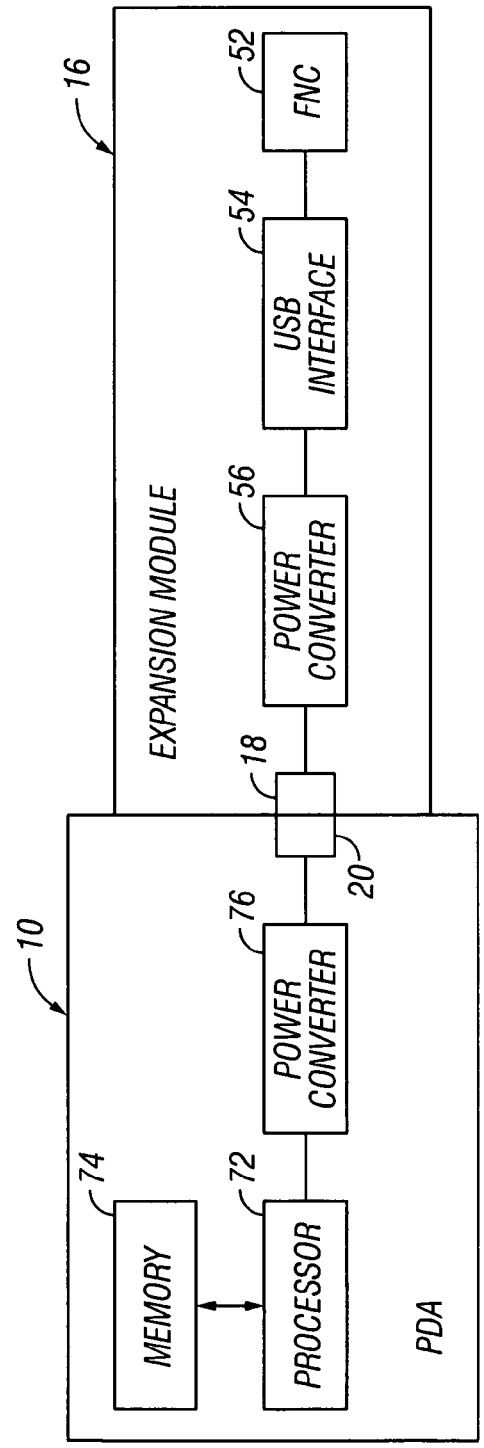
FIG. 3 is an illustration of various components of the PDA and the expansion module.

Reference is now made to FIG. 3, which shows the expansion module 16 in greater detail. The expansion module 16 includes one or more circuits 52 for providing an expansion module function (e.g., a game card, a modem) and a USB interface 54 connected between the module USB connector 18 and the circuits 52 providing the expansion module function. The expansion module 16 may be configured as a USB device. According to the USB Specification, Revision 2.0, a USB device includes three layers: a bus interface that transmits and receives packets, a second layer that handles routing data between the bus interface and various endpoints on the USB device, and a third layer that provides device functionality. For the purposes of this application, the USB interface 54 includes both the bus interface and the second layer. The USB interface 54 may be implemented through any combination of hardware, firmware and software.

The expansion module 16 also includes a module power conversion circuit 56 coupled between the module USB connector 18 and the USB interface 54. The module conversion circuit 56 reduces the voltage of a signal on the module USB connector 18 to a corresponding interface voltage and provides the reduced voltage to the USB interface 54 if the voltage on the module USB connector 18 is higher than the corresponding interface voltage. The module conversion circuit 56 boosts the voltage of a signal on the module USB connector 18 to a corresponding interface voltage and provides the boosted voltage to the USB interface 54 if the voltage on the module USB connector 18 is less than the corresponding interface voltage. The module conversion circuit 56 passes through a signal (that is, doesn't change the signal voltage) if the signal on the module USB connector 18 is at the same voltage as the corresponding interface voltage. The signal may be a data signal (D+ or D−) and/or the power signal (Vbus).

Consider the following two examples. In the first example, the PDA 10 provides a power signal at 3 volts and data signals at +1.8 volts and −1.8 volts; and the USB interface 54 of the expansion module 16 also operates with a power signal at 3 volts and data signals at +1.8 and −1.8 volts. In this first example, the module conversion circuit 56 receives the power and data signals from the module USB connector 18 and passes through the power and data signals to the USB interface 54. If both the PDA 10 and the expansion module 16 operate at the same USB voltages, the module conversion circuit 56 may be omitted.

In the second example, the PDA 10 provides a power signal at 5 volts and data signals at +3.3 volts and −3.3 volts, but the USB interface 54 of the expansion module 16 operates with a power signal at 2.7 volts and data signals at +1.8 and −1.8 volts. In this second example, the module conversion circuit 56 receives the power signal from the power pin (Vbus) of the module USB connector 18, reduces the voltage to 2.7 volts and supplies the reduced voltage power signal to the module USB interface 54. When the PDA 10 sends data to the expansion module 16, the module conversion circuit 56 receives the data signals from the data pins (D+ and D−) of the module USB connector 18, reduces the voltages from +3.3 volts and −3.3 volts to +1.8 volts and −1.8 volts, and supplies the reduced voltage data signals to the module USB interface 54. When the expansion module 16 sends data to the PDA 10, the module conversion circuit 56 receives the +1.8 and −1.8 voltage data signals from the module USB interface 54, boosts the data signals to +3.3 volts and −3.3 volts, and sends the boosted voltage data signals to the data pins (D+ and D−) of the module USB connector 18.

Figure 4:
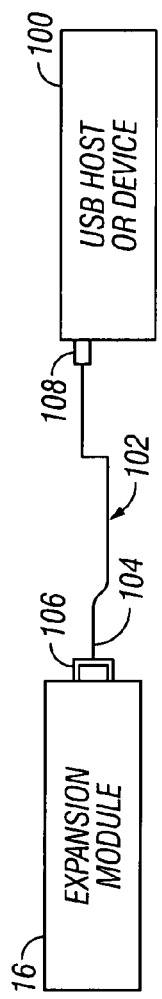
FIG. 4 is an illustration of the expansion module and a USB adapter for interfacing the expansion module with another USB host or device.

Reference is now made to FIG. 4, which shows a USB host or device 100 that operates at standard USB voltages. FIG. 4 also shows an adapter 102 for allowing the expansion module 16 to communicate with the USB host or device 100. The adapter 102 includes a cable 104, a first USB connector 106 at one end of the cable 104, and a second USB connector 108 at the other end of the cable 104. The first connector 106 can mate with the module USB connector 18 and the second connector 108 can mate with a standard USB connector on the USB host or device 100. The adapter 102 may be used to connect the expansion module 16 to the USB host or device 100. This allows the USB host or device 100 to use the functionality of the expansion module. For example, the expansion module 16 may include a game card and the USB host 100 may be a personal computer.

Consider an example in which a personal computer 100 provides a power signal at 5 volts and data signals at +3.3 volts and −3.3 volts, but the USB interface 54 of the expansion module 16 operates with a power signal at 2.7 volts and data signals at +1.8 and −1.8 volts. In this example, the module conversion circuit 56 receives the power signal from the power pin (Vbus) of the module USB connector 18, reduces the voltage to 2.7 volts and supplies the reduced voltage power signal to the module USB interface 54. When the personal computer 100 sends data to the expansion module 16, the module conversion circuit 56 receives the data signals from the data pins (D+ and D−) of the module USB connector 18, reduces the voltages from +3.3 volts and −3.3 volts to +1.8 volts and −1.8 volts, and supplies the reduced voltage data signals to the module USB interface 54. When the expansion module 16 sends data to the personal computer 100, the module conversion circuit 56 receives the +1.8 and −1.8 voltage data signals from the module USB interface 54, boosts the data signals to +3.3 volts and −3.3 volts, and sends the boosted voltage data signals to the data pins (D+ and D−) of the module USB connector 18.

Thus, the single USB connector 18 on the expansion module 16 serves two purposes. The single USB connector 18 can be used to interface the expansion module 16 with the PDA 10, and it can be used to connect the expansion module 16 to other USB hosts and devices.

The first and second connectors 106 and 108 may be connected by means other than a cable. For example, the first and second connectors 106 and 108 may be connected directly together without a cable or other means.

Returning now to FIG. 3, the PDA 10 includes a processor 72 and the memory 74. The memory 74 of the PDA 10 is encoded with an operating system and different applications (e.g., personal information manager, wireless Internet messaging, e-mail). Among other things, the operating system instructs the processor 72 to function as a USB controller (also referenced by numeral 72). The USB controller 72 may be configured as a USB host or a USB device.

In general, the USB host provides an interface to USB devices. For example, the USB host is responsible for detecting the attachment and removal of USB devices, managing the control flow between the host and the USB devices, managing the data flow between the host and the USB devices, collecting status and activity statistics, and providing power to attached USB devices. The USB host includes three layers: a USB bus interface, a USB system and a client. The USB host may be implemented through any combination of hardware, firmware and software. A root hub or a simplified root hub is integrated within the USB host controller to provide attachment points for one or more USB-compliant devices.

The PDA 10 may also have a power conversion circuit 76 coupled between the USB controller 72 and the PDA USB connector 20. If the voltage of a signal on the PDA USB connector 20 is higher than a corresponding signal voltage for the USB controller 72, the PDA conversion circuit 76 reduces the voltage of the signal on the PDA USB connector 20 to the corresponding controller signal voltage and provides the reduced voltage signal to the USB controller 72. If the voltage of a signal on the PDA USB connector 20 is less than the corresponding controller signal voltage, the PDA conversion circuit 76 boosts the voltage of the signal on the PDA USB connector 20 to the corresponding controller signal voltage and provides the boosted voltage signal to the USB controller 72. If the voltage of a signal from the USB controller 72 is greater than the voltage expected at the PDA USB connector 20, the PDA conversion circuit 76 reduces the controller signal voltage to the expected voltage and provides the reduced voltage signal to the PDA USB connector 20. If the controller signal voltage is less than the voltage expected at the PDA USB connector 20, the PDA conversion circuit 76 boosts the voltage of the controller signal to the expected voltage and provides the boosted voltage signal to the PDA USB connector 20. The PDA conversion circuit 76 passes through a signal if the signal on the PDA USB connector 20 is at the same voltage as the corresponding USB controller voltage. The signal may be a data signal (D+ or (D−) and/or the power signal (Vbus). If both the PDA 10 and the expansion module 16 operate at the same USB voltages, the PDA conversion circuit 76 may be omitted.

Both the PDA 10 and the expansion module 16 may have conversion circuits 76 and 56. However, only one of the conversion circuits 76 or 56 performs the power conversion at any time. The side that performs the power conversion (either the PDA 10 or the expansion module 16) can be specified by convention. Therefore, only the side 10 or 16 that performs the power conversion may be provided with the power conversion circuit 76 or 56.

Figure 5:
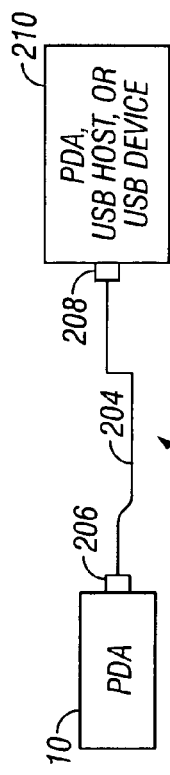
FIG. 5 is an illustration of the PDA and a USB adapter for interfacing the PDA with another PDA, USB host or USB device.

Reference is now made to FIG. 5, which shows an adapter 202 for allowing the PDA 10 to communicate with another PDA, USB host or USB device 210. The adapter 202 includes a cable 204, a first USB connector 206 at one end of the cable 204, and a second USB connector 208 at the other end of the cable 104. The first connector 206 can mate with the PDA USB connector 20 and the second connector 208 can mate with a standard USB connector on the PDA, USB host or USB device 210. When connected to a USB device, the PDA functions as a USB host. When connected to a USB host, the PDA 16 functions as a USB device.

For example, the PDA 10 is connected to a personal computer to synchronize with the personal computer. The PDA 10 operates as a USB device at voltages of 2.7 volts for power and +1.8 and −1.8 volts for data, and the computer operates at standard USB voltages of 5 volts for power and +3.3 volts and −3.3 volts for data. Since the computer includes a USB host, it provides USB power to the PDA 10. The PDA conversion circuit 76 receives the power signal from the power pin (Vbus) of the PDA USB connector 20, reduces the voltage to 2.7 volts and supplies the reduced voltage power signal to the USB controller 72. When the PDA 10 receives data from the computer, the PDA conversion circuit 76 receives the data signals from the data pins (D+ and D−) of the PDA USB connector 20, reduces the voltages from +3.3 volts and −3.3 volts to +1.8 volts and −1.8 volts, and supplies the reduced voltage data signals to the USB controller 72. When the PDA 10 sends data to the computer, the PDA conversion circuit 76 receives the +1.8 and −1.8 voltage data signals from the USB controller 72, boosts the voltages to +3.3 volts and −3.3 volts, and sends the boosted voltage data signals to the data pins (D+ and D−) of the PDA USB connector 20.

In the alternative, the second connector 208 can mate with a PDA USB connector on another PDA 210. Resulting is a peer-to-peer connection between the two PDAs 10 and 210. In this arrangement, one PDA would function as the USB host and the other PDA would function as a USB device.

Thus, the single USB connector 20 on the PDA 10 serves two purposes. The single USB connector 20 can be used to interface the expansion module 16 with the PDA 10, and it can be used to connect the PDA 10 to other USB hosts and devices.

Figure 6:
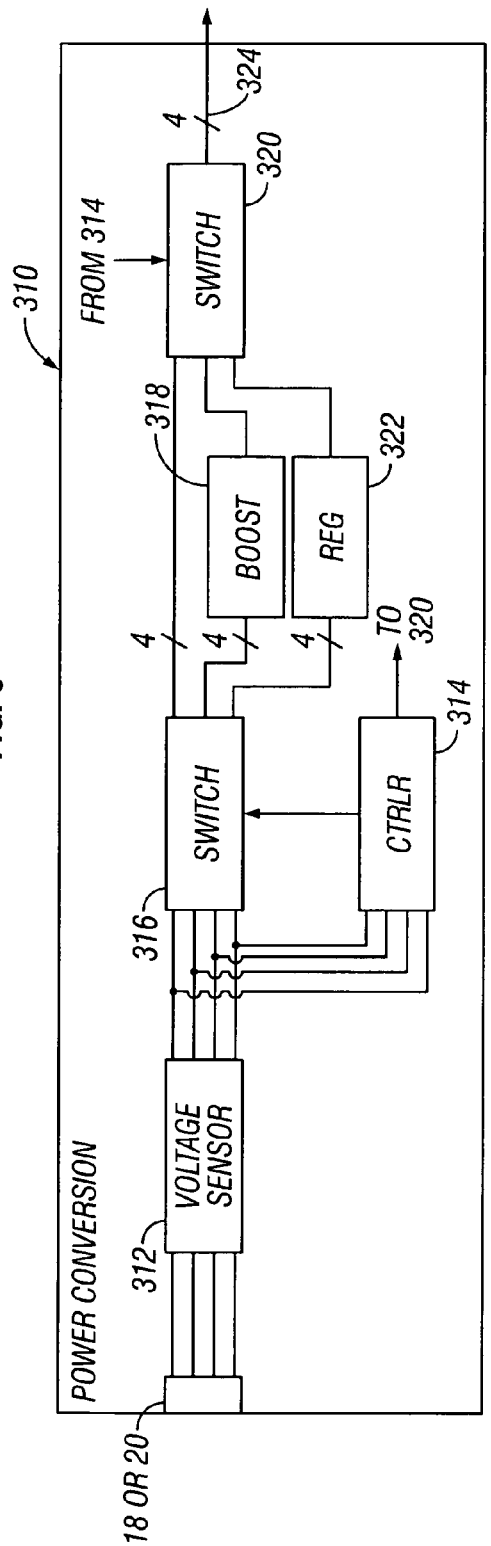
FIG. 6 is an illustration of a power conversion circuit.

Reference is now made to FIG. 6, which shows a power conversion circuit 310 that may be used as either the expansion module power conversion circuit 56 or the PDA power conversion circuit 76. The power conversion circuit 310 includes a voltage sensor 312 for sensing the voltage on the USB connector 18 or 20. Sensed voltage is supplied to a controller 314. The controller 314 determines whether the voltage of the signal should be boosted, reduced or passed through. If a signal voltage should be boosted, the controller 314 commands a first switch 316 to send the signal to a circuit such as a charge pump 318. An output of the charge pump 318 provides the boosted voltage signal to a second switch 320. If a signal voltage should be reduced, the controller 314 commands the first switch 316 to send the signal to a circuit such as a voltage regulator 322. An output of the voltage regulator 322 provides the reduced voltage signal to the second switch 320. If a signal should be passed through, the controller 314 commands the first switch 316 to send the signal directly to the second switch 320.

The controller 314 can configure the voltage regulator 322 and the charge pump 318 to provide the proper levels of voltage reduction or voltage boost. The controller 314 also commands the second switch 320 to provide the signals onto an internal bus 324. The internal bus 324 may be connected to the USB controller 72 or the USB interface 54.

For signals flowing from the internal bus 324, the controller 314 commands the second switch 320 to send the signals along the correct paths (e.g., directly to the first switch 316, to the voltage regulator 322, to the charge pump 318). The controller 314 also commands the first switch 316 to supply the proper signals to the conductors of the USB connector 18 or 20.

The power conversion circuit 310 can determine whether to boost or reduce the voltage in a variety of ways. For example, if the USB controller 72 is configured as a USB device, the power conversion circuit 310 for the PDA 10 may look at the voltages on the power (Vbus) or data (D+ and D−) pins to determine whether voltage should be boosted or reduced. If the USB controller 72 is configured as a USB host, the power conversion circuit 310 for the PDA 16 may look at the voltages on the data (D+ and D−) pins or it may examine configuration and device descriptors to determine whether voltage should be boosted or reduced.

Thus disclosed is a PDA including an expansion module that can be used with PDAs and other devices having USB interfaces. Thus, a PDA according to the present invention can utilize a wide range of expansion modules (even those operating at different voltages), and an expansion module according to the present invention can be used with a wide range of USB hosts and devices. Moreover, the single USB connector of the mobile device can interface with an expansion module or it can connect to other USB hosts and devices. Similarly, the single USB connector of the expansion module can interface with a mobile device or it can connect to other USB hosts and devices. Thus, a single USB connector on the mobile device serves two purposes, and a single USB port on the expansion module serves two purposes.

Although the present invention was described in connection with a PDA, it is not so limited. The present invention may be applied to notebook computers, "Smart Appliances," cell phones and any other types of mobile devices.

The present invention is not limited to the specific embodiments described and illustrated above. Instead, the present invention is construed according to the claims that follow.

What is claimed is:

1. A Mobile computing device that can be configured to operate both as a USB host or a USB device comprising:
   a processor, wherein an operating system of the mobile computing device instructs the processor to operate as a USB controller and the USB controller can be configured to operate as a USB host or a USB device and the processor is operationally coupled to a first power conversion circuit in the mobile computing device;
   a housing having an expansion module bay for receiving an expansion module that includes a circuit for providing an expansion module function including a game card and/or a modem functionality;
   wherein the expansion module is operationally coupled to the mobile computing device via a first USB connector in the expansion module and a second USB connector positioned in the housing to mate with the first USB connector; and the circuit interfaces with a USB interface and a second power conversion circuit, which is coupled between the USB interface and the first USB connector in the expansion module; and the first and second USB connectors have a form factor that is different than a standard USB form factor; and at any given time only the first power conversion circuit or the second power conversion circuit performs power conversion specified by convention, wherein the expansion module can be configured as a USB device by using the USB interface having a USB bus interface and a layer that handles routing data between the bus interface and plural endpoint; wherein the second power conversion circuit includes a voltage sensor for sensing a voltage signal on the first USB connector and the sensed voltage signal is supplied to a controller of the first power conversion circuit that determines whether the sensed voltage signal should be boosted, reduced or passed through and if the sensed voltage signal is to be boosted, then the controller commands a first switch to send the sensed voltage signal to a charge pump that provides a boosted voltage to a second switch.

2. The device of claim 1, wherein the first and second connectors have a form factor that is smaller than a standard USB form factor.

3. The device of claim 1, wherein if the sensed voltage signal is to be reduced, then the controller commands the first switch to send the sensed voltage signal to a voltage regulator and the output of the voltage regulator is sent to the second switch.

4. The device of claim 1, wherein if the sensed voltage signal is to be passed through then the controller commands the first switch to send the sensed voltage signal directly to the second switch.

5. The device of claim 1, wherein the second power conversion circuit reduces the voltage of a signal on the first USB connector to a corresponding interface voltage and provides the reduced voltage to the interface if the voltage on the first USB connector is higher than the corresponding interface voltage.

6. The device of claim 1, wherein the second power conversion circuit boosts the voltage of a signal on the first USB connector to a corresponding interface voltage and provides the boosted voltage to the interface if the voltage on the first second USB connector is less than the corresponding interface voltage.

7. The device of claim 1, wherein the second power conversion circuit reduces the voltage of an interface signal to a voltage expected at the first connector and provides the reduced voltage to the first connector if the interface voltage is greater than expected.

8. The device of claim 1, wherein the second power conversion circuit boosts the voltage of an interface signal to a voltage expected at the first connector and provides the boosted voltage to the first connector if the interface voltage is less than expected.

9. The device of claim 1, wherein the first power conversion circuit reduces the voltage of a signal on the second USB connector to a corresponding controller voltage and provides the reduced voltage to the controller if the voltage on the second USB connector is higher than the corresponding controller voltage.

10. The device of claim 1, wherein the first power conversion circuit boosts the voltage of a signal on the second USB connector to a corresponding controller voltage and provides the boosted voltage to the controller if the voltage on the second USB connector is less than the corresponding controller voltage.

11. The device of claim 1, wherein the first power conversion circuit reduces the voltage of a controller signal to a voltage expected at the second connector and provides the reduced voltage to the second connector if the controller voltage is greater than the corresponding voltage expected at the second connector.

12. The device of claim 1, wherein the first power conversion circuit boosts the voltage of a controller signal to a voltage expected at the second connector and provides the boosted voltage to the second connector if the controller voltage is less than the corresponding voltage expected at the second connector.

13. The device of claim 1, further comprising an adapter having a third connector that is connected to a fourth connector, the third connector being a USB connector having a standard USB form factor, the fourth connector configured to mate with one of the first and second connectors.

14. The device of claim 1, wherein the mobile computing device is a personal digital assistant, pocket computer and/or cellular phone.

15. A Mobile computing device that can operate both as a USB host or a USB device comprising:
 a housing having an expansion module bay for receiving an expansion module that includes a circuit for providing an expansion module function including a game card and/or a modem functionality;
 a processor, wherein an operating system of the mobile computing device instructs the processor to operate as a USB controller and the USB controller is configured to operate as a USB host or a USB device within the housing and the processor is operationally coupled to a first power conversion circuit; and
 a USB connector with a non-standard form factor coupled to the USB controller; the USB connector positioned within the housing for operationally coupling the circuit to the mobile computing device via a USB interface and a second power conversion circuit, wherein at any given time only the first power conversion circuit or the second power conversion circuit perform power conversion as specified by convention; wherein the expansion module can be configured as a USB device by using the USB interface having a USB bus interface and a layer that handles routing data between the bus interface and plural endpoints; and wherein the first power conversion circuit includes a voltage sensor for sensing a voltage signal on the USB connector and a sensed voltage signal is supplied to a controller of the first power conversion circuit that determines whether the sensed voltage signal should be boosted, reduced or passed through and if the sensed voltage signal is to be boosted, then the controller commands a first switch to send the sensed voltage signal to a charge pump that provides a boosted voltage to a second switch.

16. The device of claim 15, wherein if the sensed voltage signal is to be reduced, then the controller commands the first switch to send the sensed voltage signal to a voltage regulator and the output of the voltage regulator is sent to the second switch and if the sensed voltage signal is to be passed through then the controller commands the first switch to send the sensed voltage signal directly to the second switch.

17. The device of claim 15, wherein the first power conversion circuit reduces the voltage of a signal on the USB connector to a corresponding controller voltage and provides the reduced voltage to the controller if the voltage on the USB connector is higher than that corresponding controller voltage.

18. The device of claim 15, wherein the first power conversion circuit boosts the voltage of a signal on the USB connector to a corresponding controller voltage and provides the boosted voltage to the controller if the voltage on the USB connector is less than the corresponding controller voltage.

19. The device of claim 15, wherein the first power conversion circuit reduces the voltage of controller signal to a voltage expected at the USB connector and provides the reduced voltage to the USB connector if the controller voltage is greater than the corresponding voltage expected at the USB connector.

20. The device of claim 15, wherein the first power conversion circuit boosts the voltage of a controller signal to a voltage expected at the USB connector and provides the boosted voltage to the USB connector if the controller voltage is less than the corresponding voltage expected at the USB connector.

21. The device of claim 15, wherein the mobile computing device is a personal digital assistant, pocket compute and/or cellular phone.

22. An expansion module for a mobile device having a first power conversion circuit, the expansion module comprising:
   a USB interface operationally coupled to a processor in the mobile device, wherein the processor can function as a USB controller when configured by the mobile device operating system to operate as a USB host or a USB device; wherein the USB interface is operationally coupled to a second power conversion circuit; and to a circuit for providing an expansion module function including a game card and/or a modem functionality; and a USB connector that couples the expansion module to the mobile device; wherein at any given time only the first power conversion circuit or the second power conversion circuit performs power conversion as specified by convention; wherein the expansion module can be configured as a USB device by using the USB interface having a USB bus interface and a layer that handles routing data between the bus interface and plural endpoints and wherein the second power conversion circuit includes a voltage sensor for sensing a voltage signal on the USB connector and a sensed voltage signal is supplied to a controller of the second power conversion circuit that determines whether the sensed voltage signal should be boosted, reduced or passed through and if the sensed voltage signal is to be boosted, then the controller commands a first switch to send the sensed voltage signal to a charge pump that provides a boosted voltage to a second switch and if the sensed voltage signal is to be reduced, then the controller commands the first switch to send the sensed voltage signal to a voltage regulator and the output of the voltage regulator is sent to the second switch and if the sensed voltage signal is to be passed through then the controller commands the first switch to send the sensed voltage signal directly to the second switch.

23. The device of claim 22, wherein the USB connector has a non-standard USB form factor.

24. The device of claim 22, wherein the second power conversion circuit reduces the voltage of a signal on the USB connector to a corresponding interface voltage and provides the reduced voltage to the interface if the voltage on the USB connector is higher than the corresponding expansion module voltage.

25. The device of claim 22, wherein the second power conversion circuit boosts the voltage of a signal on the USB connector to a corresponding interface voltage and provides the boosted voltage to the interface if the voltage on the USB connector is less than the corresponding expansion module voltage.

26. The device of claim 22, wherein the second power conversion circuit reduces the voltage of an interface signal to a voltage expected at the USB connector and provides the reduced voltage to the USB connector if the interface voltage is greater than the corresponding voltage expected at the USB connector.

27. The device of claim 22, wherein the second power conversion circuit boosts the voltage of an interface signal to a voltage expected at the USB connector and provides the boosted voltage to the USB connector if the interface voltage is less than the corresponding voltage expected at the USB connector.

* * * * *